H. E. AULMAN.
CORN AND CANE HARVESTER.
APPLICATION FILED MAY 17, 1920.

1,362,912.

Patented Dec. 21, 1920.
3 SHEETS—SHEET 1.

WITNESS

INVENTOR
Harry E. Aulman
BY
Booth & Booth
ATTORNEYS

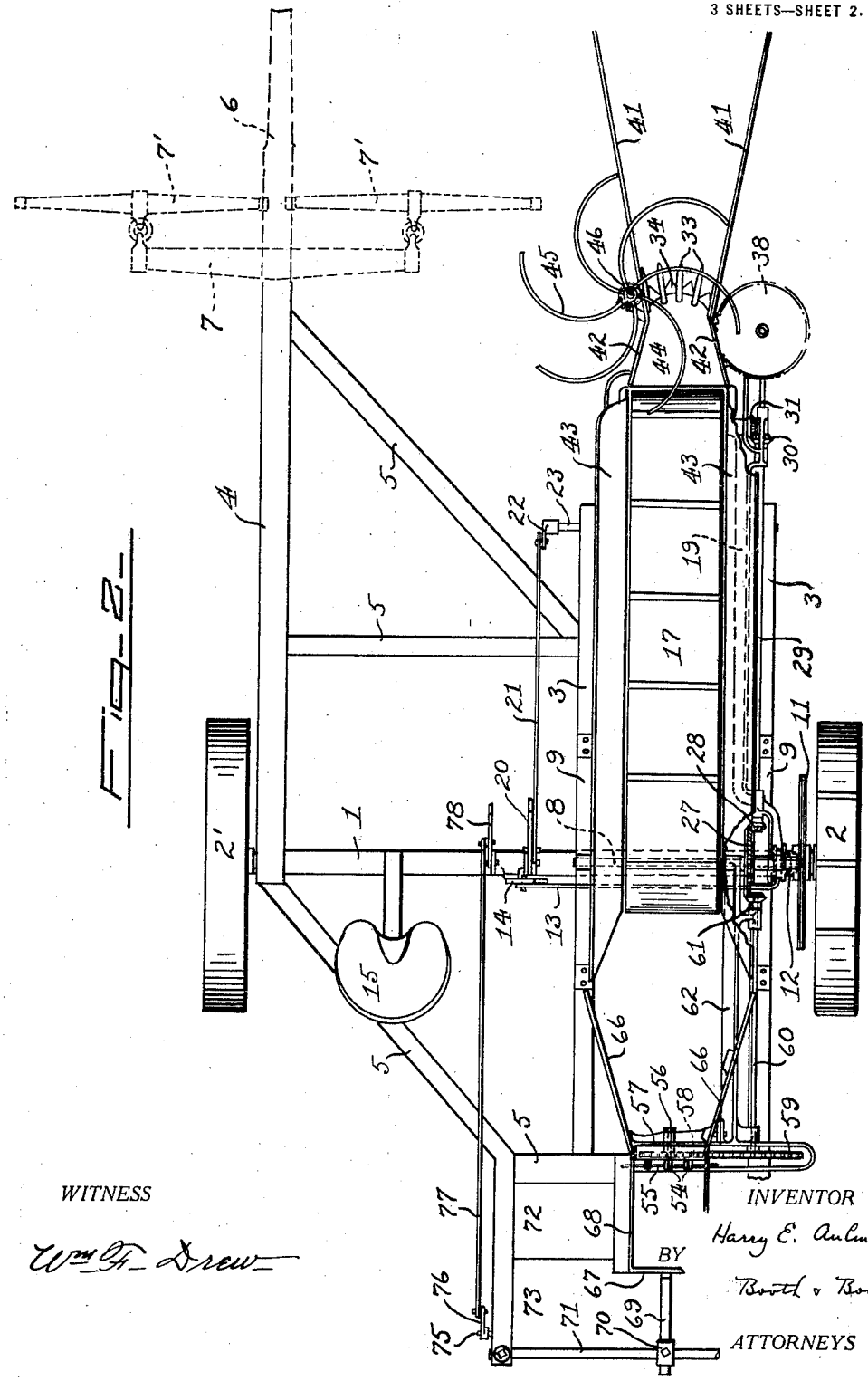

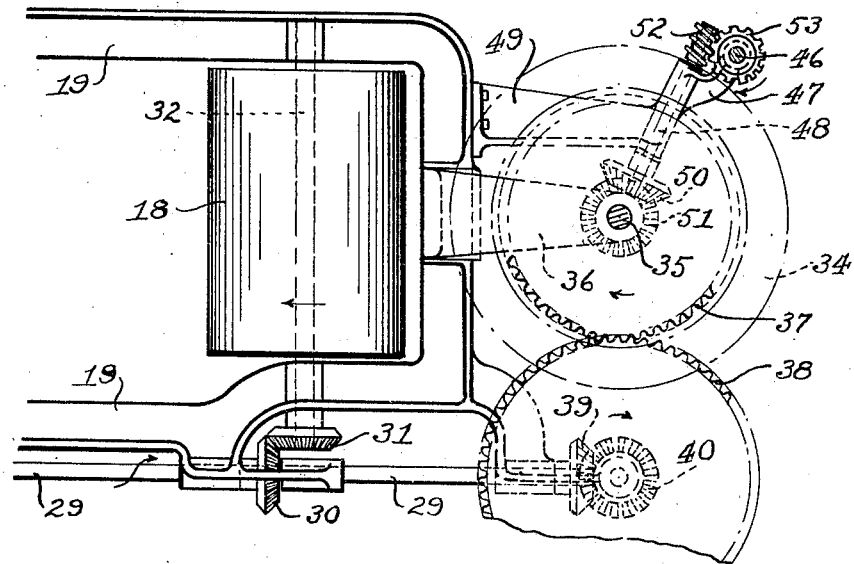
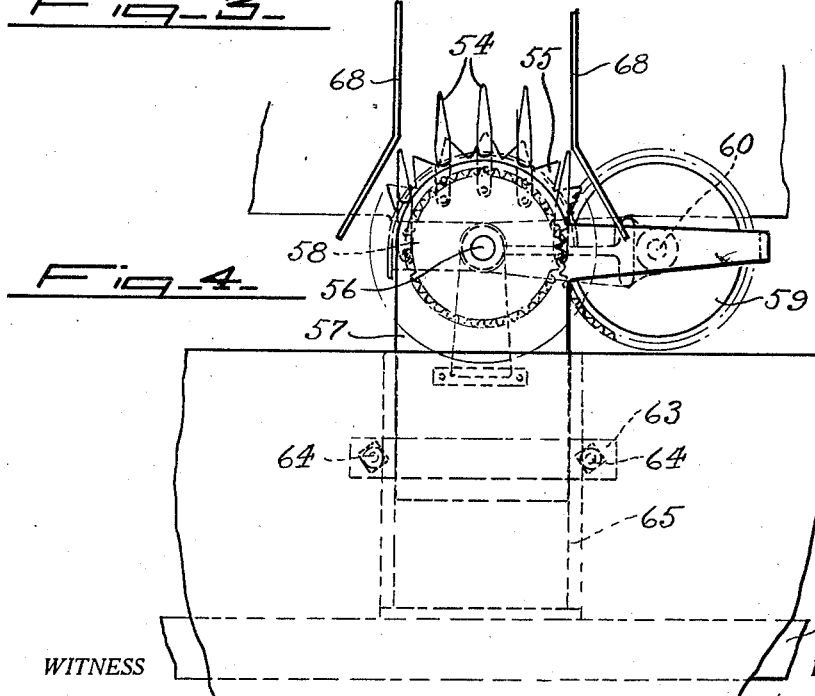

UNITED STATES PATENT OFFICE.

HARRY E. AULMAN, OF VISALIA, CALIFORNIA, ASSIGNOR OF ONE-HALF TO JACOB A. ADELSBACH, OF VISALIA, CALIFORNIA.

CORN AND CANE HARVESTER.

1,362,912.      Specification of Letters Patent.      Patented Dec. 21, 1920.

Application filed May 17, 1920. Serial No. 381,916.

*To all whom it may concern:*

Be it known that I, HARRY E. AULMAN, a citizen of the United States, residing at Visalia, in the county of Tulare and State of California, have invented certain new and useful Improvements in Corn and Cane Harvesters, of which the following is a specification.

My invention relates to that class of agricultural implements which by reason of cutting off the heads of growing grain, are commonly called headers.

My invention though applicable to any crop which on account of marked diversity in length of stalks and consequent height of heads above the ground requires the sickle to travel relatively low down in order to cut the shortest stalks, is particularly adapted for crops which are planted in rows, such, for example, as Egyptian-corn, milo-maize, Kafir-corn, and sugar-cane. These plants by reason of growing in rows with greater room, produce such heavy thick and long stalks and are so irregular in height that the necessity for cutting them low down presents a problem concerning their subsequent handling in the separating or threshing machine, which can not be solved by the ordinary mechanism of a combined harvester, the shakers and screens of which would clog up under the unusual burden of such thick long stalks.

It is this problem, heretofore unsolved as far as I am aware, which has resulted in the universal custom of heading by hand the crop of Egyptian-corn, which may be taken as an example of the especial applicability of my invention and in terms of which, for the sake of illustration, I will herein describe said invention.

Egyptian-corn is planted in rows. It produces relatively thick stalks of great diversity in height. To get all the heads, the sickle must operate low. This results in the greater mass of the cut stalks being relatively long and heavy. But the stalks are waste material, the heads only being wanted.

My invention contemplates a header involving such a manipulation and presentation of the cut stalks as will result in a uniform second cutting of the heads only, and their proper disposition, and the separate disposition of the headless stalks, so that only the heads need be fed to the separator.

To this end my invention consists in the novel header which I shall hereinafter fully describe by reference to the accompanying drawings, in which—

Fig. 2 is a plan view of the same.

Fig. 3 is a fragmental plan view, enlarged, of a portion of the forward end of the conveyer belt frame and the mechanism carried thereby.

Fig. 4 is a fragmental rear elevation, enlarged, of the rear sickle and its associated parts.

Figure 1:
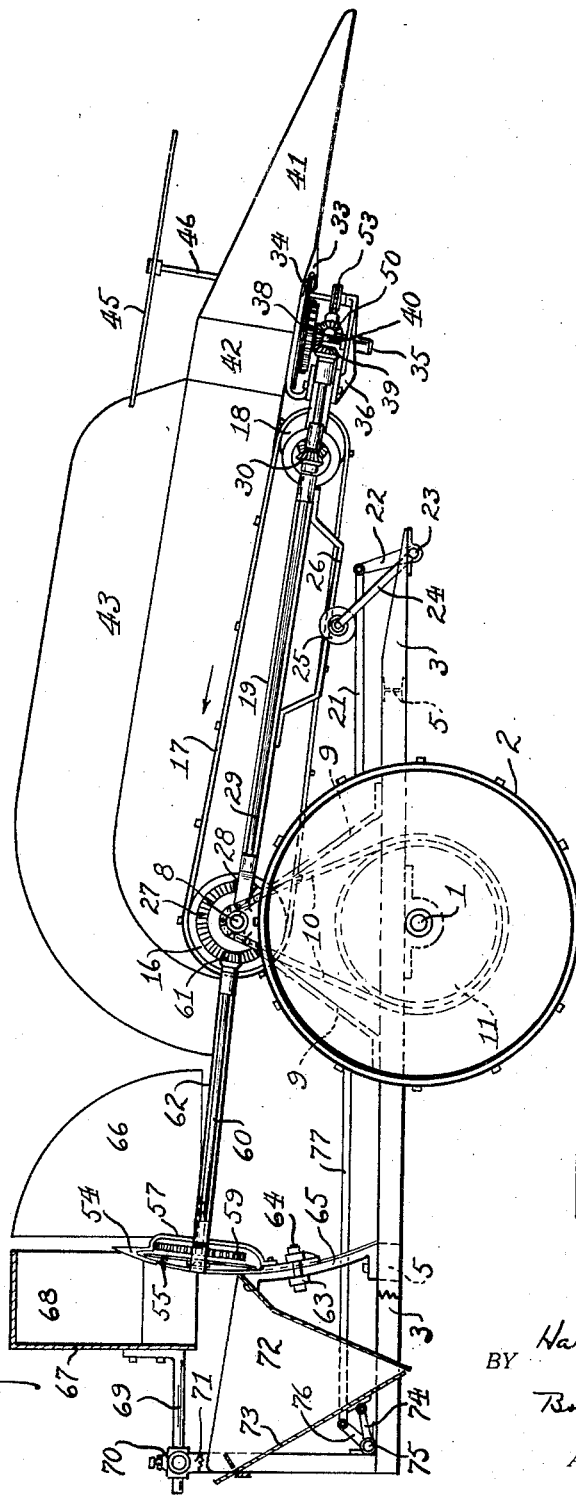
Figure 1 is a side elevation of my complete header, certain parts being shown in section.

In the drawings, the reference numeral 1 designates an axle, upon which are mounted a pair of ground running wheels 2 and 2'. The axle 1 supports a frame, comprising a pair of parallel spaced longitudinally directed members 3, positioned at one side of the machine, a longitudinal member 4 at the other side, and suitable cross and diagonal members 5. The member 4 carries at its forward end suitable draft gear, indicated in Fig. 2 of the drawings as comprising a tongue 6, a double-tree 7 and swingle-trees 7', to which a team may be hitched. Any suitable draft gear, however, may be used, the form shown being merely an example.

Above the axle 1, and positioned at that side of the machine carrying the spaced frame members 3, is a horizontal rotatable shaft 8, Figs. 1 and 2, supported in suitable brackets 9 rising from said frame members 3. This shaft is driven by means of a chain 10 passing over a sprocket 11 freely rotatable about the axle 1, and adapted to be connected with the wheel 2 by a clutch 12, Fig. 2; said clutch being operated by a rod 13 and a lever 14 positioned within reach of the driver's seat 15.

A pulley 16, Fig. 1, is freely rotatable upon the shaft 8, and supports the rear end of a draper or carrier belt 17, Figs. 1 and 2, whose forward end runs over a pulley 18, Figs. 1 and 3, carried in the forward end of a frame 19. Said draper or carrier frame is pivotally mounted at its rear end upon the shaft 8, and its forward end is capable of being raised or lowered for a purpose to be made apparent hereinafter.

The vertical adjustment of the draper frame 19 is accomplished by means of a hand lever 20, Fig. 2, positioned within reach of the driver's seat 15, and which, by means of a connecting rod 21 and a lever 22, Figs. 1 and 2, causes oscillation or rocking of a transverse shaft 23 carried at the forward ends of the spaced frame members 3. Said shaft 23 carries a pair of arms, one of which is shown at 24 in Fig. 1, and which are provided with flanged rollers 25 adapted to bear against suitably formed tracks 26 carried by and positioned beneath the draper frame 19. The forward end of the draper frame thus rests upon the arms 24, and can be raised or lowered by manipulation of the hand lever 20.

A bevel gear 27—Figs. 1 and 2 is fixed upon the drive shaft 8. Said bevel gear meshes with a pinion 28, and thereby drives a forwardly extending rotatable shaft 29 supported at one side of the draper frame. This shaft, near its forward end, carries a bevel gear 30, Figs. 1, 2 and 3, which meshes with a similar gear 31 fixed upon a shaft 32, Fig. 3, to which the forward draper pulley 18 is fixed. The draper 17 is thus driven, at a relatively high speed and in the direction indicated by the arrow in Fig. 1, from its forward pulley 18, the rear pulley 16 being an idler.

At the forward end of the draper frame is a horizontally disposed sickle for cutting the standing grain stalks, comprising stationary fingers 33, Figs. 1 and 2, and a rotary toothed knife 34. The latter is fixed upon a short vertical shaft 35, Fig. 3, journaled in a suitable bracket 36, and carrying a spur gear 37, which is driven by a similar gear 38. The latter is driven from the longitudinal shaft 29 by means of a pair of bevel gears 39 and 40, Figs. 1 and 3, the gear 39 being fixed upon said shaft 29 and the gear 40 being fixed to said spur gear 38. Thus the sickle is driven, at a relatively high speed, from the same longitudinal shaft 29 which drives the carrier or draper.

The standing grain stalks are guided into the sickle thus described by means of a pair of spaced guide arms 41, Figs. 1 and 2, which extend forwardly from the region of said sickle. Said guide arms converge to said sickle, and flare again in the rear thereof, as shown at 42, to meet the parallel side guides 43 of the carrier or draper. A bottom plate 44, Fig. 2, lies over the rear portion of the sickle, to guide the cut grain onto said draper.

The cut grain stalks are caused to fall upon the carrier or draper with their heads toward the rear by a rotating finger reel 45, Figs. 1 and 2, carried by a vertical shaft 46. Said reel shaft 46, as shown in Fig. 3, is supported by a suitable bearing bracket 47, and is rotated by means of a short horizontal shaft 48 which is journaled in a suitable bracket 49 and carries a bevel gear 50 meshing with a similar gear 51 secured to the sickle shaft 35, and a worm 52 meshing with a worm wheel 53 mounted on the reel shaft 46. The reel 45 is thus rotated, at a relatively slow speed, from the sickle shaft.

At the rear of the machine, and in longitudinal alinement with the carrier 17, but spaced therefrom by a gap is a second sickle, vertically disposed, for cutting the heads from the previously cut stalks, comprising a series of stationary fingers 54 and a rotary toothed knife 55, Figs. 1, 2 and 4. Said knife is carried upon a short shaft 56, Fig. 4, journaled in a suitable bracket 57, and is driven by a pair of spur gears 58 and 59 from a longitudinally disposed shaft 60, Figs. 1, 2 and 4, which carries at its forward end a pinion 61, Figs. 1 and 2, meshing with the bevel gear 27 of the drive shaft 8. The rear sickle bracket 57 is secured to the rear end of a longitudinally disposed bar 62, which is pivotally mounted, at its forward end, about the drive shaft 8, and said bracket 57 is further adjustably secured, by a clamp 63 and bolts 64, Figs. 1 and 4, to an arcuate member 65 extending upwardly from the rear frame cross member 5.

The grain is thrown by the carrier 17 onto the rear sickle thus described, and is guided by converging side guards 66, Figs. 1 and 2. A stop plate 67, vertically disposed behind said sickle, is also provided with side wings 68 forming rearward extensions of the guards 66, and is adjustably supported by a rod 69 carried in a clamp 70 mounted on a suitable member 71 secured to the rear of the frame. The grain, as it is thrown rearwardly by the rapidly moving carrier 17, impinges head-on against the stop 67, and falls horizontally upon the rear sickle, which cuts the stalks from the heads.

The stalks, after being cut from the heads, fall through the opening between the carrier and the rear sickle, and drop upon the ground. The heads, falling in the rear of said sickle, drop into a bin 72 carried at the rear of the machine. This bin has a rear gate 73, which may be opened, to dump the heads, by sliding upwardly and swinging rearwardly. Said gate is thus operated by an arm 74, Fig. 1, secured to a horizontal shaft 75 journaled at the rear of the frame. A lever 76, Figs. 1 and 2, secured to the end of said shaft 75, is connected by a rod 77 with a hand lever 78, Fig. 2, positioned within reach of the driver's seat 15.

The operation of the machine is as follows: One row is to be cut at a time, the machine traveling along the length of the row with its front guides 41 straddling the standing stalks and directing them while keeping them upright, into the relatively narrow cutting space between said guides, thus presenting them to the best advantage to the horizontally rotating front sickle 34.

In practice it is best to adjust the front sickle to cut from one and a half feet to say three and a half feet from the ground. This is necessary for the reason that in heavy, damp soil the corn grows tall, frequently six or more feet high, while corn in light soil may be four feet in height. To head the corn successfully and to avoid congestion in the rear, these stalks should be cut, say somewhere between two and a half and three and a half feet in length. The stalks cut by the front sickle are acted upon by the rotating finger reel 45, which kicks them back with heads toward the rear, upon the rearwardly traveling carrier or draper.

By the draper, the cut stalks, varying in length, are all carried back heads foremost, at a rapid rate of speed; and from the rear end of said draper the stalks are projected across the gap between said rear end and the stop 67, and their flight arrested by their heads coming in contact with said stop. Thus arrested, the stalks fall upon the vertically rotating rear sickle 55, and the heads are all cut relatively short and of uniform length. This length is determined by the adjustment of the stop 67 toward or away from the rear sickle, said adjustment being convenient for the reason that Egyptian corn is of freakish growth. The heads are sometimes upright and sometimes bent over. The straight stem corn can be trimmed closer to the head by adjusting the stop 67 closer to the sickle.

The rear sickle is also adjustable vertically as described. This is necessary because when cutting tall corn, and the front sickle is consequently raised, the cut stalks will drop lower in the back and would probably miss the rear sickle, if the latter were not adjustable.

The uniformly re-cut heads of the stalks drop into the controllable bin 72, while the waste bodies of the stalks fall through the open gap to the ground.

The cut heads are discharged from the bin 72 at such intervals and in such places on the ground as may be desired, by lifting the sliding gate 73 of the bin. This is very essential in that it allows the heads to dry in the sun several days before piling for the thresher, the bin 72 making this possible by permitting dumping of the heads in transverse rows throughout the field.

Thus there need be no sacking of green corn.

In the thresher, because of the second cutting done by my header, there are no heavy stalks which will not pass through the shakers without causing frequent trouble in clogging and congesting the screens. Congestion of the separator shakers and screens causes much loss, but when my machine is used for the cutting, only the heads are supplied to the thresher, unburdened with a useless length of heavy stalk.

I claim:—

1. A header comprising means for cutting the standing stalks; a carrier to receive and carry the cut stalks lengthwise, heads foremost; a stop member against which the heads of the cut stalks are directed by the carrier; and means by which the arrested stalks are again cut.

2. A header comprising means for cutting the standing stalks; a carrier to receive the cut stalks lengthwise, heads foremost; a stop member against which the heads of the cut stalks are directed by the carrier; means by which the arrested stalks are again cut; and means for adjusting the stop member with relation to the second cutting means.

3. A header comprising means at the front for cutting the standing stalks; a carrier to receive the cut stalks lengthwise, heads foremost; means for adjusting the cutting front and carrier with relation to the ground; a stop member against which the heads of the cut stalks are directed by the carrier; means spaced from the carrier by which the arrested stalks are again cut; and means for vertically adjusting said second cutting means conformably to the adjustment of the cutting front of the header.

4. A header comprising means at the front for cutting the standing stalks; a carrier to receive the cut stalks lengthwise, heads foremost; means for adjusting the cutting front and carrier with relation to the ground; a stop member against which the heads of the cut stalks are directed by the carrier; means spaced from the carrier by which the arrested stalks are again cut; means for vertically adjusting said second cutting means conformably to the adjustment of the cutting front of the header; and means for adjusting the stop member toward and away from the second cutting means.

5. A header comprising means for cutting the standing stalks; a carrier to receive the cut stalks lengthwise, heads foremost; a stop member at the rear of the carrier and spaced therefrom by a gap across which the cut stalks are projected head foremost and into contact with said stop member whereby they are arrested; and means located in said gap for again cutting the stalks so arrested.

6. A header comprising means for cutting the standing stalks; a carrier to receive the cut stalks lengthwise, heads foremost; a stop member at the rear of the carrier and spaced therefrom by a gap across which the cut stalks are projected head foremost and into contact with said stop member whereby they are arrested; means located in said gap for again cutting the stalks so arrested; and a bin for separately receiving the head-portions of said re-cut stalks.

7. A header comprising means for cutting the standing stalks; a carrier to receive the cut stalks lengthwise, heads foremost; a stop member at the rear of the carrier and spaced therefrom by a gap across which the cut stalks are projected head foremost and into contact with said stop member whereby they are arrested; means located in said gap for again cutting the stalks so arrested; and a bin for separately receiving the head portions of said re-cut stalks, said bin having a controllable discharge.

8. A header comprising means for cutting the standing stalks; a carrier; means for depositing the cut stalks lengthwise, head foremost on said carrier; a stop member at the rear of the carrier and spaced therefrom by a gap across which the cut stalks are projected head foremost and into contact with said stop member whereby they are arrested; and means located in said gap for again cutting the stalks so arrested.

9. A header comprising means for cutting the standing stalks; a carrier; means for depositing the cut stalks lengthwise, head foremost on said carrier; a stop member at the rear of the carrier and spaced therefrom by a gap across which the cut stalks are projected head foremost and into contact with said stop member whereby they are arrested; means located in said gap for again cutting the stalks so arrested; and a bin for separately receiving the head portions of said re-cut stalks.

10. A header comprising spaced front guides; a horizontally rotating sickle to which said guides direct the standing stalks and by which they are cut; a carrier upon which the cut stalks are delivered lengthwise, heads foremost; a stop member at the rear of the carrier and spaced therefrom by a gap across which the cut stalks are projected head foremost and into contact with said stop member whereby they are arrested; and a vertically rotating sickle in said gap for again cutting the stalks so arrested.

11. A header comprising spaced front guides; a horizontally rotating sickle to which said guides direct the standing stalks and by which they are cut; a carrier; a rotating finger-reel for depositing the cut stalks lengthwise, head foremost on said carrier; a stop member at the rear of the carrier and spaced therefrom by a gap across which the cut stalks are projected head foremost and into contact with said stop member whereby they are arrested; and a vertically rotating sickle in said gap for again cutting the stalks so arrested.

12. A header comprising spaced front guides; a horizontally rotating sickle to which said guides direct the standing stalks and by which they are cut; a carrier; a rotating finger-reel for depositing the cut stalks lengthwise, head foremost on said carrier; a stop member at the rear of the carrier and spaced therefrom by a gap across which the cut stalks are projected head foremost and into contact with said stop member whereby they are arrested; a vertically rotating sickle in said gap for again cutting the stalks so arrested; and means for separately receiving and discharging the head portions of said re-cut stalks.

In testimony whereof I have signed my name to this specification.

HARRY E. AULMAN.